March 20, 1951 L. H. ZEPP ET AL 2,545,681

TUNING APPARATUS

Filed March 22, 1947 2 Sheets-Sheet 1

INVENTORS
LOUIS H. ZEPP AND
BY JOHN W. HAYWARD

Brown, Denk & Synnestvedt
AGENTS

March 20, 1951 L. H. ZEPP ET AL 2,545,681
TUNING APPARATUS
Filed March 22, 1947 2 Sheets-Sheet 2
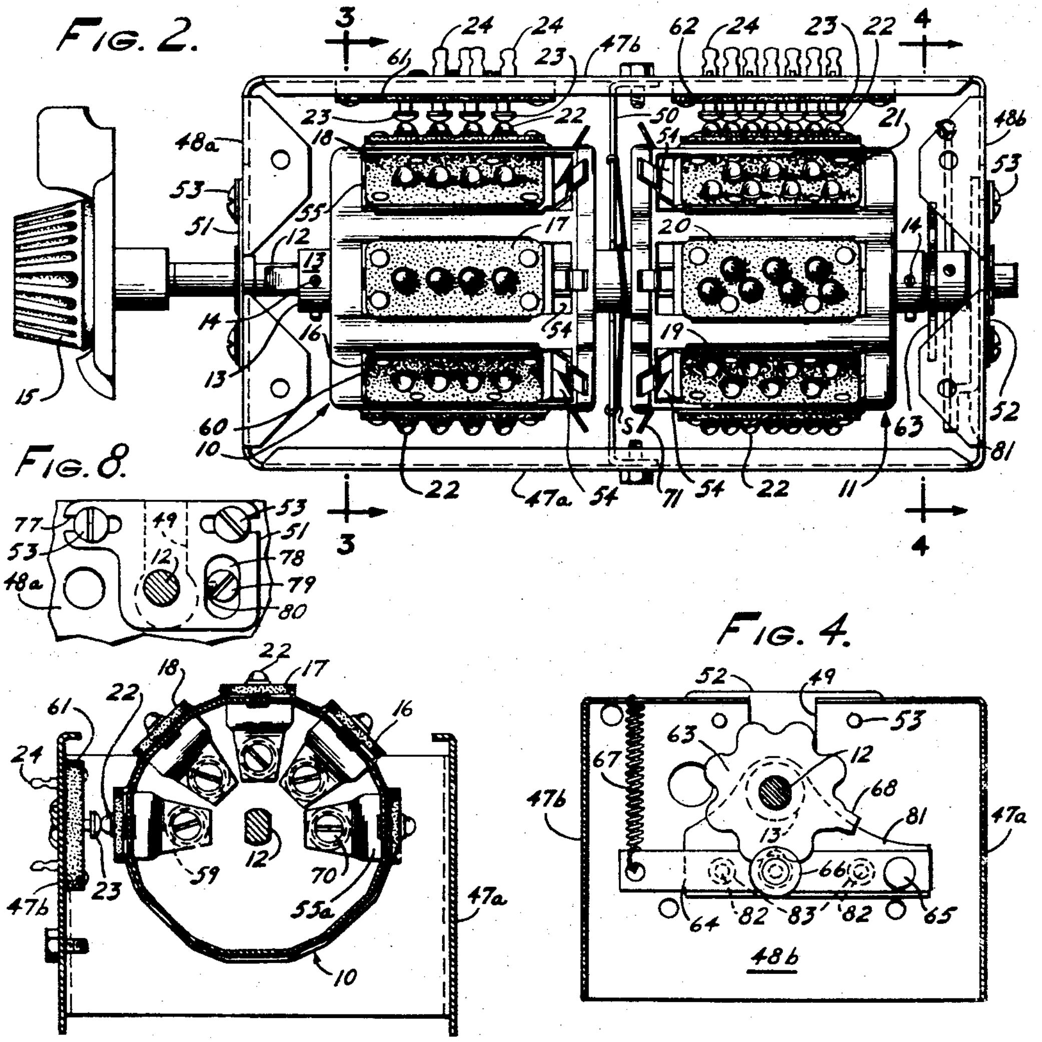
FIG. 2. FIG. 8. FIG. 4.
FIG. 3.
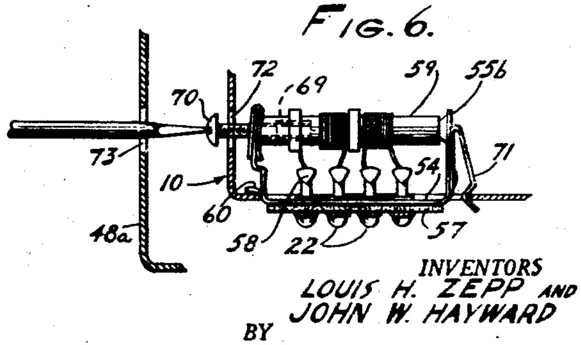
FIG. 6.
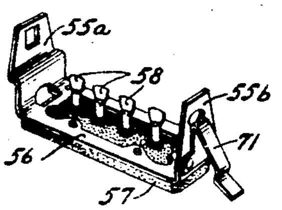
FIG. 5.
INVENTORS
LOUIS H. ZEPP AND
JOHN W. HAYWARD
BY
Brown, Denk & Synnestvedt
AGENTS Patented Mar. 20, 1951 2,545,681

UNITED STATES PATENT OFFICE 2,545,681

TUNING APPARATUS

Louis H. Zepp and John W. Hayward, Philadelphia, Pa., assignors to Philco Corporation, Philadelphia, Pa., a corporation of Pennsylvania Application March 22, 1947, Serial No. 736,435

8 Claims. (Cl. 171—242)

The present invention is concerned with tuning devices for electrical apparatus and, while of broader applicability, relates especially to tuning devices having particular utility in conjunction with television receivers.

Still more particularly, the present invention has to do with devices adapted to effect controlled station selection by the selective substitution of reactive circuit elements, for example tuned circuits including inductances, in the antenna and oscillator circuits of a receiver.

In certain types of electrical apparatus, particularly in television receivers, it is not only necessary to tune a number of circuits, during the selection of each broadcast station, the signals of which the operator desires to receive, but it is also highly desirable simultaneously to effect a selection of one of a plurality of antennas. In television apparatus, for example, for most satisfactory reception it is necessary to tune the antenna and, if a dipole is used, the length of the dipole antenna should be approximately equal to a half wavelength at the carrier frequency to be received. This fact has introduced additional complexities in the problem of station selection and, heretofore, it has not been possible to effect both tuning of the necessary circuits of the receiver and selection of an antenna of particular operating characteristics by the manipulation of a single selector element. Additionally, problems have arisen as a result of the fact that the tuning apparatus must be of such character as to make it possible to effect such station selection while, at the same time, the apparatus should be sufficiently flexible to accommodate preselection of different groups of stations to which the receiver will respond upon manipulation of the control element.

Accordingly, with the foregoing in mind, it is an important object of the present invention to provide, for the first time, a simple, compact, unitary control device—operable by the manipulation of a single dial—which device will with a high degree of reliability select the particular circuits necessary to receive any one of a number of predetermined broadcast stations.

In accordance with a particular feature of the invention, the unitary control device includes a rotatable member upon which are carried the inductances, or other pretuned reactive circuits which the invention contemplates. This arrangement is in contradistinction to generally accepted practice—in which pretuned circuits are grouped upon fixed framing, and a movable selector switch cooperates with said circuits progressively—and has many important advantages. In apparatus constructed in accordance with this invention, for example, the inductance lead length is maintained at an absolute minimum, the reactance of all of the inductances may be adjusted from a single readily accessible position, and all the pretuned circuits may be inserted from a single convenient location.

It is another object to provide a single dial television control which includes circuit elements (such as the tuned inductances shown) so cooperative with the receiver circuits as to be adapted to condition the receiver to respond to the signals of a preselected group of stations, which control is further of such a nature that—if the location of the receiver is changed—circuit elements appropriate to a new group of stations may readily be inserted in the apparatus without requiring expert services, or the use of aligning instruments.

It is a further object of the invention to provide such tuning apparatus, in which the inductance of the several coils may be adjusted individually after said coils have been inserted in the tuning apparatus. To these general ends, the apparatus includes a plurality of bases or supports, each carrying reactive circuits appropriate to certain of the receiver circuits, the supports being releasably retained within the single dial tuning apparatus and disposed for selective movement into a station selecting position, in which position contact is made with conductors leading to the circuits of the receiver.

The invention extends further to certain novel constructional features and arrangements, hereinafter described and illustrated in the attached drawings, in which:

Figure 2 is a plan view of the control or station selector, per se;

Figure 3 is a sectional view, taken as indicated by the line 3—3 of Figure 2, and with certain parts omitted in the interest of clarity in illustration;

Figure 4 is a sectional illustration, taken on the line 4—4 of Figure 2;

Figure 5 is a view in perspective of one of the removable coil supports;

Figure 6 is an elevational view illustrating one of said supports with a coil form associated therewith, and showing the manner in which the reactance of the windings, or other circuit elements employed, may be adjusted;

Figure 8 is a fragmentary elevational view, looking toward one end wall of the apparatus as shown in Figure 2.

Figures 1, 7:
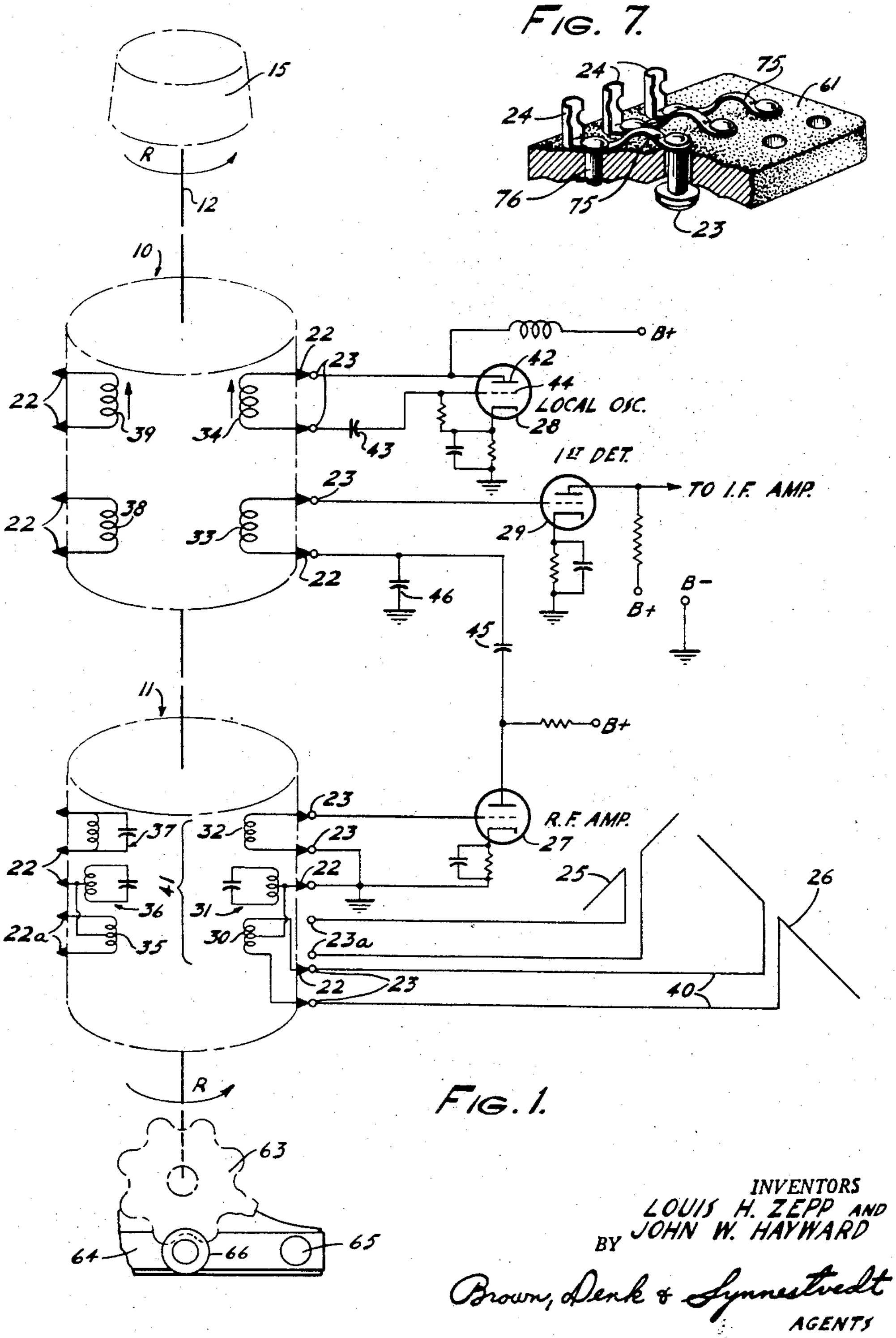
Figure 1 illustrates circuits representative of those to be tuned when the apparatus of the invention is embodied in a television receiver, and diagrammatically represents a single dial control in accordance with the present invention, by means of which control the several circuits are tuned concurrently with selection of the proper antenna.
Figure 7 is a fragmentary perspective illustration of contact structure shown in Figures 2 and 3.

Referring to the tuning device illustrated in Figures 2 to 4, and first briefly described, the illustrated embodiment of the invention comprises a pair of rotatable barrels, or "turret" members, 10 and 11, each of which is fixed upon a shaft 12 in any convenient manner, for example by the use of collars and associated set screws shown at 13 and 14, respectively. These turret members are adapted for rotational movement about the axis of shaft 12, in response to manipulation of a control knob shown at 15. As will more clearly appear hereinafter, the turret 10 carries a group of removable coil forms, three of which appear at 16, 17 and 18, and each of these forms supports inductances tuned to a particular station and includes both the inductance necessary to tune the R.-F. amplifier plate circuit and the inductance required to tune the oscillator tank circuit. Similarly, the turret member 11 carries a plurality of coil forms, three of which are represented at 19, 20 and 21, which forms are also readily removable, as will be set forth more fully hereinafter, and each of which includes inductance coils adapted to be employed in the antenna circuit of the television receiver and which, additionally, are utilized to select either one of two antennas. The antennas may be of different lengths or, if desired, may be differently oriented.

It will be understood that illustration and description of inductances are purely exemplary, since other types of circuit elements, such as capacitances, could as readily be employed.

The coil forms or supports carried by each turret are provided with contact buttons, certain of which are designated by the reference numeral 22 and, as will be apparent from Figure 2, these coil forms and their associated inductances may be brought progressively into a predetermined angular position in which the buttons 22 bear against similar fixed contacts 23, each of which has a terminal 24 adapted for connection to the conductor leading to the circuits of the receiver.

Now making reference to the electrical circuits illustrated schematically in Figure 1, it is seen that this figure illustrates the connections and coupling elements which associate the selected antenna (25 or 26), the R.-F. amplifier 27, the local oscillator 28, and the first detector, or mixer, 29. The stationary contact elements 23, mounted on the stator of the control device hereinabove briefly described, are represented in Figure 1, and the movable contact elements 22, carried by the several inductance supports, are represented, in Figure 1, by arrowheads. The two turret members appear, diagrammatically, in Figure 1 (see 10 and 11) and it will be understood that rotation of the control knob 15 acts to move the inductance supports in such manner as to bring said supports into registry with the stationary contacts 23, progressively and in pairs.

In Figure 1, one representative set of switchable circuit elements, comprising windings 30, 31, 32, 33 and 34 is shown as connected to appropriate elements of the receiving apparatus. A second set of switchable circuit elements (it being understood that several such sets are employed in practice), comprises the windings 35, 36, 37, 38 and 39, these latter windings being shown in a rest or standby position, ready to be moved into engagement with the aforesaid stationary contact elements 23 upon rotation of the turret members 10 and 11, in response to actuation of the knob 15, as hereinbefore mentioned.

The electrical circuits employed in any one position of the station selector switch, and illustrated by way of example, are of known type and, accordingly, a brief description of such circuits is sufficient for the purposes of the present invention. As illustrated in Figure 1, the dipole antenna 26 is coupled to the grid circuit of the R.-F. amplifier 27 through transmission line 40 and the antenna coupling network 41. This network comprises an input coil or winding 30, a tuned link winding 31, and an output coil or winding 32. The local oscillator 28 is provided with a tank coil 34 which is connected directly to the anode 42 and, by way of a coupling condenser 43, to the control grid 44. The oscillator tank coil 34 is tuned to resonance by the associated plate-to-cathode capacity and by the associated grid-to-cathode capacity, which capacities appear in series across the coil 34. It will be apparent that the oscillator is of the Colpitts type, the usual physical capacitors being replaced here by the inherent interelectrode capacities of the tube.

The radio frequency output of the R.-F. amplifier tube 27 is applied to the control grid of the first detector, or mixer, tube, 29, by way of the coupling network comprising coupling condenser 45 and the coupling coil 33. This coupling network may be tuned to resonance by means of the trimmer condenser 46. The signal generated by oscillator 28 is injected into the grid circuit of the first detector 29, through the mutual inductance between the windings 33 and 34. As a result of the mixing, in the first detector 29, of the local oscillator signal and the radio frequency signal, there appears in the plate circuit of the first detector an intermediate frequency signal, the frequency of which is equal to the difference between the frequencies of the two applied signals. This intermediate frequency, in turn, may be applied to an intermediate frequency amplifier (not shown), in any convenient manner. Since the invention is not concerned with the foregoing known circuits, except insofar as they cooperate with the tuning and selection apparatus of the present invention, and since such tuning and selection apparatus is also applicable to other electrical circuits, further and more detailed description of the circuits of the receiver are not necessary herein.

As will now be understood, when the next succeeding pair of inductance support elements or coil forms (all of which elements are carried by the turret members 10 and 11) are brought into registry with the fixed contacts 23, another broadcast station will be selected, as predetermined by the nature of the circuit elements (35–39, inclusive) carried by the next pair of supports and, further, switching is effected from the antenna 26 to the antenna 25, through cooperation of that set of movable contacts shown at 22a and the contacts 23a which lead to said antenna 25.

Broadly, it is within the purview of the invention, utilizing the apparatus illustrated and described, to effect selection between antennas having different operating characteristics, for example antennas having different directional properties, or which differ in physical dimensions. In practice, a different antenna will be included in the circuit of the receiver, either when the frequency of the station to be received differs so widely from the frequency corresponding to the dipole antenna 26 that substitution of a dipole of different length is desirable, or when two stations to be received differ in direction rather than in frequency.

As an example of the latter type of condition, two similar antennas can be employed, each oriented to discriminate against an undesired one of two stations operating on the same frequency. In such event two sets of movable coils are used, each tuned to the same frequency. For the sake of simplicity of illustration, Figure 1 shows antennas which differ both in dimensions and orientation.

The present television band, for example, has been established to cover frequencies from 44 megacycles to 216 megacycles. As above mentioned, dipole antennas, commonly used in television reception, have maximum response when their physical length is equal to approximately a half wave-length at the frequency of the transmission being received. As is readily apparent from the relatively wide range of frequencies which must be covered, provision must be made for changing antenna structures, if the receiver is to respond to the entire band. As set forth above, and in particular accordance with this invention, the presently described apparatus provides novel means whereby a lower frequency coil may be connected to a lower frequency antenna and a higher frequency coil may be connected to an antenna adapted for use at higher frequencies, or identical sets of coils may be selectively coupled with differently oriented antennas; these results being accomplished without conscious selection on the part of the user, and by the simple manipulation of a single, main tuning control.

Now making additional and more detailed reference to Figures 2 to 6, it will be understood that the concepts of the present invention may be embodied in tuning apparatus which is of extreme simplicity in respect to both construction and use.

The tuning mechanism, per se, is mounted within a housing comprising side walls **47*a* and 47*b*, and end walls shown at 48*a* and 48*b*. Each of the end walls is provided with a slot, one of which appears at 49 in Figure 4. A central stiffening sheet 50 extends between and is secured to the side walls 47*a* and 47*b*, and this sheet also is slotted, centrally, to accommodate the shaft 12 and the spacing and securing collars. In the device shown, it has been found desirable to include a resilient grounding spring S, which may be wrapped about the central collar 13 and bear resiliently against the sheet 50**.

The construction is such as to result in a high degree of ease in assembling the complete device, the assembly sequence involving securement of the two turret members 10 and 11 upon the shaft 12, after which the shaft—carrying the turret members—is introduced into the housing by lowering the two ends of the shaft 12 into the slots provided in the end walls **48*a* and 48*b*. Following this, retaining plates, apertured to receive the shaft 12, are fitted over each end of said shaft and are secured to the adjacent end walls 48*a* and 48*b* to complete the main assembly. The aforesaid retaining plates are shown at 51 and 52 in Figure 2, and may conveniently be secured to the adjacent end wall of the housing through the agency of the screws shown at 53**.

As appears in Figure 3, in the illustrated embodiment each turret member is octagonal, the number of faces or sides being determined by the maximum number of stations to be preselected, and each of the faces is provided with an elongated rectangular aperture (designated at 54 in Figures 2 and 6) within which may be received the coil supports, which latter appear to best advantage in Figures 5 and 6.

Each such support comprises a pair of upstanding flanges **55*a* and 55*b* joined by a centrally apertured web 56, to which is secured a block 57 which may be of any suitable non-conducting material. The aforesaid contacts 22 pass through and are supported by the block 57 and each contact has a lug 58 to which is secured a conductor leading from the circuits carried by the coil form 59, which form is, in turn, supported by the flanges 55*a* and 55*b*. A retaining element or tongue 60 projects from one end of each support member, and each member, additionally, has a spring clip 71** disposed at its opposite end.

Reference to Figures 2 and 6 illustrates that the supports are mounted by inserting the tongue 60 beneath the edge defining one end of the aperture 54, and the support is pressed in toward the axis of the turret until the spring clip 71 engages with the opposite end of the rectangular opening, which final position is represented in Figure 6.

The coils carried by the member illustrated in Figure 6 may, for example, correspond with windings 33 and 34, illustrated schematically in Figure 1, and for this reason this coil support is provided with only four of the aforesaid contacts 22. Except for the fact that they include seven rather than four contacts (in correspondence with the schematic showings of Figure 1), the coil supports utilized in turret member 11 are of construction similar to that already described with reference to Figure 6.

By the insertion of such coil supports (certain of which may also provide support for capacitors shown in Figure 1) it is possible, in the embodiment illustrated, to provide for the selection of, for example, up to eight different broadcast stations. It will be appreciated that the apparatus may be modified to receive a different group of stations, if the location of the receiver is moved, by the simple process of substituting a second set of coil supports, the inductances of which are tuned in correspondence with the frequency of the new stations to be preselected.

As brought out above, rotation of knob 15 causes the coil assemblies (illustrated schematically in Figure 1, and one of which is shown at 59 in Figure 6) to move, in pairs, into registry with a pair of contact-carrying blocks 61 and 62, which blocks are fixedly secured to the side wall **47*b* of the housing structure, and which blocks carry the aforesaid fixed contacts 23** from which conductors extend to the circuits of the receiver.

In accordance with a feature of the invention, and as appears to best advantage in Figure 7, these contact-block assemblies include simple and reliable apparatus effective to urge the fixed contacts 23 resiliently into position such that proper contact is made with each set of contacts 22, as the latter are brought into operative position. As shown in the figure, each of the contacts 23 has associated therewith a resilient, metallic arm 75 which is suitably secured, by means of a rivet 76, to the insulating base 61. Each of the rivets 76 further carries one of the aforesaid terminals 24, the arm 75 serving as an electrical conductor between the contact 23 and the associated one of said terminals 24. As will now be understood, the contacts 23 are moved backwardly through the block 61 against the action of the resilient arms 75, when any selected set of the movable contacts 22 is brought into station-selecting position, where said contacts 22 bear against the contacts 23.

It is also a feature of the invention that the pressure between the fixed and the barrel-carried contacts may be accurately adjusted in a convenient manner, by shifting the turret and shaft assembly toward and away from the contacts 23 carried by blocks 61. To this end, and as illustrated in Figure 8, each of the end plates 51 and 52 (since the plates are similar, illustration is limited to plate 51) is provided with oppositely facing elongate apertures 77 to accommodate sliding movement of the end plate with respect to the screws 53, which secure said plate to the adjacent end wall 48a. Such sliding movement moves the shaft 12—which is journalled in the end plates—and, accordingly, makes it possible to move the turret members 10 and 11 in a manner serving to vary the pressure between contacts 22 and 23. Movement of the plate 51 is accomplished through the agency of a slot 78 and an associated rotatable member 79 carried eccentrically by a pin 80 positioned in wall 48a. After loosening the screws 53, the contact pressure is readily adjusted by sliding end plates 51 and 52 through the agency of suitable tools engaged with the eccentrically mounted members 79. If desired, the members 79 may be formed as a part of the tool.

Means, illustrated in Figure 4, is provided to index the shaft 12 in such manner that each step-by-step movement of said shaft brings a different pair of coil supports into the position in which contact is made with the fixed contacts carried by the wall 47b. As illustrated, this indexing means takes the form of a cam member 63 having eight detent areas. The cam member 63 is, of course, fixed to the shaft 12, and cooperates with a lever 64 connected to a plate 81 by a pin shown at 65. The plate 81 is mounted upon and movable about shaft 12, for a purpose set forth below. Lever 64 carries a roller 66 which is urged into contact with the cam member 63, as by means of the spring shown at 67, and cooperates with the aforesaid detent areas to insure that the turret members will be properly indexed in positions such that the desired coil supports are in registry with the fixed contacts 23. Cam member 63 carries a radially extending stop 68, which latter is cooperable with roller 66 to provide fixed limits for the angular movement of shaft 12 and thus make it possible to set up and receive stations in a predetermined progressive sequence.

After the desired contact pressure has been determined, in the manner already described, it may be necessary to adjust the detent apparatus to ensure that roller 66 is in proper registry with the detent apertures, when the turrets have been moved to a station-selecting position. This adjustment is accomplished by loosening a pair of screws (82 in Figure 4) which pass through end wall 48b and which are connected to and serve to fix the position of plate 81. It is then possible to rotate plate 81, and hence lever 64, about shaft 12 by virtue of oversize apertures 83 provided in wall 48b—until the roller 66 is properly aligned with the adjacent one of the detent areas of cam member 63.

The inductance of each of the windings may be adjusted, if such is required, through the agency of core members and associated adjusting screws, shown at 69 and 70 in Figure 6. The coil supports are inserted in the turret members in such way that the spring clips 71 lie in the central region of the housing (see Figure 2), and a plurality of apertures are provided in one end wall of each of the turret members, the several apertures being arranged in registry with the adjusting screws 70. One of these apertures appears at 72, in Figure 6, and it will be seen that, to accommodate manipulation of the adjusting screws, the end walls 48a and 48b are apertured (see for example the opening shown at 73 in wall 48a) in order that a screw driver may be introduced through the end wall of the housing, and thence into position to engage with the screw 70.

From the foregoing description it will be evident that the invention provides a compact, unitary tuning device which makes it possible to effect both selective reception of desired broadcast stations and the selection of an antenna of particular operating characteristics, by the manipulation of a single control element. Further, the character of the apparatus is such that substitutions may be readily made in the stations preselected, without requiring expert services.

The apparatus of the invention is further characterized by unusual ease of adjustment and assembly, and is advantageous in that the coil lead lengths are very materially reduced, which latter feature is of particular importance when the device is employed in high frequency circuits.

We claim:

1. In a switching assembly, a rotatable barrel-like member having a plurality of outwardly-facing apertures and a plurality of non-conductive supporting bases each carrying reactive circuit means and including contacts, said bases further including clip means releasably engaging edge portions defining said apertures and providing for ready insertion and removal of each base within a corresponding one of said apertures.

2. A reactive circuit assembly adapted for use with electrical switching apparatus, comprising: a non-conductive supporting base, reactive circuit means, structure including a resilient clip securing said circuit means to said base, contacts carried by said base and included in circuit with said reactive circuit means, means adjustably carried by said structure and adapted to react against said clip to provide for adjustment of the reactance of said circuit means, and securing apparatus disposed for cooperation with the aforesaid switching apparatus to provide for releasable connection of said assembly with the switching apparatus.

3. A reactive circuit assembly adapted for use with electrical switching apparatus, comprising: a non-conductive supporting base, reactive circuit means, structure including a resilient clip securing said circuit means to said base, contacts carried by said base and included in circuit with said reactive circuit means, means adjustably carried by said structure and adapted to react against said clip to provide for adjustment of the reactance of said circuit means, and a spring element carried by said base and disposed for cooperation with the aforesaid switching apparatus to provide for releasable connection of said assembly with the switching apparatus.

4. In a switching assembly, a rotatable barrel-like member having a plurality of outwardly-facing apertures arranged about the periphery thereof, a plurality of non-conductive supporting bases, each carrying reactive circuit means, each said base further including a portion projecting therefrom, and resilient clip means, said projecting portion being adapted to engage the wall structure defining an associated one of said apertures in response to introduction of the base into said aperture and said clip means reacting between said barrel-like member and said base when said base has been so inserted, the construction and arrangement being such that said base is resiliently and removably retained within the aperture through the agency of said clip means and said portion.

5. In a switching assembly, a rotatable member including a pair of spaced support portions arranged in substantial parallelism, and a plurality of non-conductive supporting bases each carrying reactive circuit means and including contacts, said bases and support portions including interengageable detent means and clip means, said detent means and clip means releasably retaining each base between the said spaced support portions.

6. In a switching assembly, a rotatable member including a pair of spaced support portions arranged in substantial parallelism, a plurality of non-conductive supporting bases each carrying reactive circuit means, each said base further including a portion projecting from one part thereof and engaged with one of said support portions, and a clip member securing another part of said base to the other of said support portions, the construction and arrangement being such that each said base is resiliently and removably retained between said support portions through the agency of said clip member and said projecting portion.

7. In switching apparatus, a housing including spaced end walls, a barrel-like frame member, means rotatably journalling said frame member in said end walls, and a plurality of circuit means carried by said frame member, each of said circuit means including an element through the agency of which the reactance of the associated circuit means may be adjusted, said elements being disposed to confront one of said end walls and being accessible therethrough, whereby to provide for adjustment of the reactance of said circuit means.

8. In switching apparatus, a mounting rod, a frame member including contact means, said frame member being rotatably supported by said mounting rod to effect a switching operation, means for effecting controlled rotational movement of said frame member to bring its contact means into position to make contact with fixed contact structure, and means adjustably supporting said rod and providing for movement of said frame member in a direction generally perpendicular to the axis of said rod to adjust the position of the contact means carried by said frame member.

LOUIS H. ZEPP.
JOHN W. HAYWARD.

REFERENCES CITED

The following references are of record in the file of this patent:

UNITED STATES PATENTS

| Number | Name | Date |
|---|---|---|
| 1,949,733 | Zidar | Mar. 6, 1934 |
| 2,039,885 | Chunn | May 5, 1936 |
| 2,078,908 | Harrison | Apr. 27, 1937 |
| 2,100,402 | Lyons | Nov. 30, 1937 |
| 2,103,035 | Lear | Dec. 21, 1937 |
| 2,104,458 | Goudet et al. | Jan. 4, 1938 |
| 2,125,612 | Herbst et al. | Aug. 2, 1938 |
| 2,264,850 | Koch | Dec. 2, 1941 |
| 2,272,431 | Rankin | Feb. 10, 1942 |
| 2,430,990 | Moore | Nov. 18, 1947 |